US009512899B2

(12) United States Patent
Bennstedt

(10) Patent No.: US 9,512,899 B2
(45) Date of Patent: Dec. 6, 2016

(54) STATIONARY GEAR UNIT

(75) Inventor: Niklas Bennstedt, Svärdsjö (SE)

(73) Assignee: AUTOINVENT TRANSIP AB, Svardsjo (SE)

( * ) Notice: Subject to any disclaimer, the term of this patent is extended or adjusted under 35 U.S.C. 154(b) by 446 days.

(21) Appl. No.: 13/876,939

(22) PCT Filed: Oct. 12, 2011

(86) PCT No.: PCT/SE2011/051217
§ 371 (c)(1),
(2), (4) Date: Mar. 29, 2013

(87) PCT Pub. No.: WO2012/050514
PCT Pub. Date: Apr. 19, 2012

(65) Prior Publication Data
US 2013/0186223 A1 Jul. 25, 2013

(30) Foreign Application Priority Data

Oct. 13, 2010 (SE) ........................ 1051070

(51) Int. Cl.
*F16H 57/021* (2012.01)
*F16H 1/20* (2006.01)
(Continued)

(52) U.S. Cl.
CPC .................. *F16H 1/20* (2013.01); *F03D 15/00* (2016.05); *F16H 57/021* (2013.01);
(Continued)

(58) Field of Classification Search
CPC ................ F16H 1/08; F16H 1/20; F16H 1/22; F16H 57/021; F16H 57/022; F16H 57/033; F16H 2057/02004; F16H 2057/02078; F03D 11/02
See application file for complete search history.

(56) References Cited

U.S. PATENT DOCUMENTS 2,600,912 A * 6/1952 Olson ................ F16H 1/20
74/325
2,762,232 A * 9/1956 Bade ................ F16H 1/20
74/421 R
(Continued)

FOREIGN PATENT DOCUMENTS

DE 1204907 B 11/1965
DE 19654896 A1 1/1998
(Continued)

OTHER PUBLICATIONS

Extended European search report in corresponding European application dated May 28, 2014, 4 pages.
(Continued)

*Primary Examiner* — Ha D Ho
*Assistant Examiner* — Jude Agendia
(74) *Attorney, Agent, or Firm* — Harness, Dickey & Pierce, P.L.C.

(57) ABSTRACT

A method of stepping up the speed of a rotary motion from a first speed, supplied to an input shaft (26), to a second speed delivered by an output shaft (28), comprises transmitting said rotary motion from said input shaft (26), via a drive gear (34) of said input shaft (26), the drive gear (34) being helical and having a first helix angle ($\psi_{in}$), to a layshaft arrangement, so as to generate a first axial thrust (F1) of the input shaft (26) in a first axial direction; transmitting said rotary motion from said layshaft arrangement, via a driven gear (44) of said output shaft (28), said driven gear (44) being helical and having a second helix angle ($\psi_{out}$) that is larger than said first helix angle ($\psi_{in}$), to said output shaft (28), so as to generate a second axial thrust (F2) of the output shaft (28) in a second direction, said second direction being substantially opposite to said first direction; and applying said first axial thrust (F1) and said second axial thrust (F2) to the same location of an axially rigid support (Continued)

structure (50), such that said first and second axial thrusts (F1, F2) counter-act and at least partly cancel out in said support structure (50).

16 Claims, 7 Drawing Sheets

(51) Int. Cl.
F16H 1/22 (2006.01)
F03D 15/00 (2016.01)
F16H 57/02 (2012.01)

(52) U.S. Cl.
CPC .......... F05B 2260/4031 (2013.01); F16H 2057/02078 (2013.01); Y02E 10/722 (2013.01); Y10T 74/19651 (2015.01)

(56) References Cited

U.S. PATENT DOCUMENTS

| | | | |
|---|---|---|---|
| 2,835,138 A | 5/1958 | Hey et al. | |
| 2,888,831 A * | 6/1959 | Malcom | F16H 1/20 74/421 R |
| 2,982,144 A * | 5/1961 | Wallgren | F16H 1/22 74/392 |
| 3,029,661 A * | 4/1962 | Schmitter | F16H 1/20 184/6.12 |
| 3,894,621 A | 7/1975 | Quick | |
| 4,073,198 A * | 2/1978 | Ford | F16H 35/16 346/136 |
| 4,612,816 A * | 9/1986 | Chalik | F16H 55/18 74/401 |
| 4,719,813 A * | 1/1988 | Chalik | F16H 55/18 74/409 |
| 5,067,361 A * | 11/1991 | Lachenmaier | F16H 57/033 74/325 |
| 5,169,370 A * | 12/1992 | Dye | F16H 48/285 475/226 |
| 5,205,797 A * | 4/1993 | Kobayashi | B60K 17/3465 475/221 |
| 5,302,159 A * | 4/1994 | Dye | F16H 48/285 475/226 |
| 5,680,793 A * | 10/1997 | Flamang | F16H 1/20 74/325 |
| 5,916,054 A * | 6/1999 | Kobayashi | B60K 17/3465 475/220 |
| 5,927,147 A * | 7/1999 | Morrow | F16H 1/08 74/410 |
| 6,029,532 A * | 2/2000 | Phillips | F16H 1/20 74/421 A |
| 6,263,760 B1 * | 7/2001 | Berselli | F16H 57/033 74/606 R |
| 2003/0123984 A1 | 7/2003 | Wilde et al. | |
| 2004/0060380 A1 | 4/2004 | Christ | |
| 2005/0061093 A1 | 3/2005 | Tsberger | |
| 2006/0089227 A1* | 4/2006 | Fanselow | F16H 48/10 475/248 |
| 2015/0068338 A1* | 3/2015 | Bennstedt | F16H 57/0037 74/414 |

FOREIGN PATENT DOCUMENTS

| | | |
|---|---|---|
| DE | 19961695 A1 | 6/2001 |
| JP | 58160651 A | 9/1983 |
| JP | 2005321000 A | 11/2005 |

OTHER PUBLICATIONS

International Search Report for PCT/SE2011/051217, mailed Jan. 31, 2012; ISA/SE.

* cited by examiner

STATIONARY GEAR UNIT

CROSS-REFERENCE TO RELATED APPLICATIONS

This application is a 371 U.S. National Stage of International Application No. PCT/SE2011/051217, filed on Oct. 12, 2011, which claims priority to Swedish Patent Application No. 1051070-9, filed Oct. 13, 2010, the contents of which are hereby incorporated by reference in their entirety as if fully set forth herein.

FIELD OF THE INVENTION

The present invention relates to a method of stepping up the speed of a rotary motion from a first speed, supplied to an input shaft, to a second speed delivered by an output shaft. The present invention further relates to a stationary gear unit comprising an input shaft, and an output shaft substantially parallel with said input shaft, the gear unit being configured for providing a non-unity transmission ratio between said input shaft and said output shaft via a layshaft arrangement.

BACKGROUND OF THE INVENTION

The use of wind turbines for generation of electricity is becoming increasingly popular. A wind turbine typically comprises a rotor provided with rotor blades for transforming the wind to a rotary motion. The rotor is typically arranged for driving an electric generator. Since the wind typically rotates the wing at a relatively low speed and a modern generator is typically designed for operating at a relatively high speed, a gear unit is needed for stepping up the rotation speed of the turbine rotor to a speed suitable for an electric generator.

Wind turbines are often placed on high windturbine towers, which are erected in less densely populated areas or at sea. In order to facilitate installation and service, as well as to minimize the mechanical load on the wind turbine tower, a small volume and a low weight of the gearing is highly desirable. At the same time, the construction needs to be robust and tolerant to weather and load, since a remote wind turbine location may make the wind turbine difficult and time consuming for service personnel to access. Therefore, relatively light, simple, and reliable planetary gear units, which provide a high transmission ratio, are generally used.

US 2003/0123984 A1 discloses a wind turbine equipped with a planetary gear unit provided with helical planet gears. Each planet gear is journalled to a planet gear carrier in taper roller bearings, which are arranged in an "O" configuration for providing radial as well as axial support.

There is however a need for a gear unit offering higher reliability, lower weight, and/or lower cost of manufacture.

SUMMARY OF THE INVENTION

It is an object of the present invention to solve, or at least mitigate, parts or all of the above mentioned problems. To this end, there is provided a method of stepping up the speed of a rotary motion from a first speed, supplied to an input shaft, to a second speed delivered by an output shaft, the method comprising transmitting said rotary motion from said input shaft, via a drive gear of said input shaft, the drive gear being helical and having a first helix angle, to a layshaft arrangement, so as to generate a first axial thrust of the input shaft in a first axial direction;

transmitting said rotary motion from said layshaft arrangement, via a driven gear of said output shaft, said driven gear being helical and having a second helix angle that is larger than said first helix angle, to said output shaft, so as to generate a second axial thrust of the output shaft in a second direction, said second direction being substantially opposite to said first direction; and applying at least a portion of said first axial thrust and at least a portion of said second axial thrust to the same location of an axially rigid support structure, such that said first and second axial thrusts counter-act and at least partly cancel out in said support structure.

The difference in helix angles will operate so as to make the magnitudes of said thrusts more equal, so as to increase the extent to which said axial thrusts at least partly cancel each other out. The resultant force on the axially rigid support structure will thereby be limited. And by applying said axial thrusts to the same location of said support structure, axial movement of the input and output shafts due to varying load conditions can be minimized. As a comparison, in step-up methods of prior art, input and output shafts generally apply their respective dynamic axial thrusts onto opposite end walls of a gear unit housing, such that the gear unit housing flexes or yields somewhat under the axial load, and the input and output shafts are thereby somewhat pushed apart. Such movement may lead to premature failure of bearings, particularly under varying load conditions. Axial movement also requires a somewhat forgiving gear unit design, where substantive tooth clearance or backlash allows some freedom of movement. By instead applying the oppositely directed axial thrusts to the same location of a support structure, it is possible to obtain an axially rigid relation between the input and output shafts, such that the input and output shafts will not move significantly in the axial direction relative to each other. Hence, a gear unit with tighter backlash, and thereby increased lifetime, may be designed for such a step-up method. Throughout this disclosure, "substantially opposite directions" is to be construed as said directions forming an angle of more than 165°.

According to an embodiment, said axially rigid support structure is a main thrust bearing arrangement interconnecting said input and output shafts, such that said axial thrusts at least partly cancel out via the main thrust bearing arrangement. The main thrust bearing arrangement may comprise one or several thrust bearings arranged as a "push bearing arrangement", i.e. for providing support when the input and output shafts are pushed towards each other; as a "pull bearing arrangement", i.e. for providing support against the input and output shafts being drawn apart; or as a bidirectional bearing arrangement providing support in both axial directions.

According to an embodiment, said axially rigid support structure is a main thrust bearing support axially supporting said input shaft and said output shaft, such that said axial thrusts at least partly cancel out via said main thrust bearing support. The main thrust bearing support may be any axially rigid structure holding both the input shaft and the output shaft in respective thrust bearings, so as to allow the respective axial thrusts to cancel out. By way of example, the main thrust bearing support may be a centrally located bracket in a gear unit, said bracket holding the input and output shafts such that the drive gear of the input shaft and the driven gear of the output shaft are located on opposite sides of said bracket. Each of said input and output shafts will thereby either simultaneously pull or simultaneously push onto opposite sides of said main thrust bearing support, such that said thrusts will at least partly cancel out. Alternatively, the main thrust bearing support may be a portion of an end wall of a gear unit housing, with respect to which wall the drive gear of the input shaft and the driven gear of the output shaft may be arranged on the same side. In such a configuration, one of said shafts will apply an axially pulling force onto said wall, while the other shaft will apply an axially pushing force, such that said thrusts will at least partly cancel out in said wall.

According to an embodiment, said method further comprises transmitting said rotary motion via a plurality of layshafts of said layshaft arrangement; and for each layshaft of said layshaft arrangement, generating a driven gear axial thrust in a helical driven gear having a driven gear helix angle;

generating a drive gear axial thrust in a helical drive gear having a drive gear helix angle, said drive gear helix angle being larger than said driven gear helix angle;

directing the driven gear axial thrust in said second direction; and directing the drive gear axial thrust in said first direction, such that the axial thrust of the respective driven and drive gears of each layshaft at least partly cancel out within said layshaft. By canceling also at least a portion of the axial thrusts acting on each layshaft, the total resultant axial loads on a gear unit will be reduced.

According to another aspect of the invention, parts or all of the above mentioned problems are solved, or at least mitigated, by a stationary gear unit comprising an input shaft, and an output shaft substantially parallel with said input shaft, the gear unit being configured for providing a transmission ratio between said input shaft and said output shaft via a layshaft arrangement, the input shaft being provided with a drive gear in mesh with a driven gear of said layshaft arrangement, and the output shaft being provided with a driven gear in mesh with a drive gear of said layshaft arrangement, the transmission ratio being non-unity such that one gear of the drive gear of the input shaft and the driven gear of the output shaft will be arranged for operating at a relatively lower torque, and the other gear will be arranged for operating at a relatively higher torque, said relatively higher torque being higher than said relatively lower torque; the input shaft being journalled in an input shaft main thrust bearing arrangement, mounted to a main thrust bearing support, and being arranged for limiting axial movement of the input shaft in a first axial direction;

the output shaft being journalled in an output shaft main thrust bearing arrangement, said output shaft main thrust bearing arrangement being co-located with said input shaft main thrust bearing arrangement on said main thrust bearing support, said output shaft main thrust bearing arrangement being arranged for limiting axial movement of the output shaft in a second axial direction, said second axial direction being substantially opposite to said first axial direction; said main thrust bearing support rigidly connecting the input shaft main thrust bearing arrangement to the output shaft main thrust bearing arrangement; said drive gear of said input shaft being helical of a first hand; said driven gear of said output shaft being helical of a second hand, said second hand being the same as the first hand for a positive transmission ratio and opposite to said first hand for a negative transmission ratio; and said gear arranged for operating at a relatively lower torque having a helix angle exceeding the helix angle of said gear arranged for operating at a relatively higher torque.

In such a gear unit, when torque is supplied to the input shaft in a drive direction, axial thrust generated by the drive gear of the input shaft will be directed in said first axial direction, against said input shaft main thrust bearing arrangement. Axial thrust generated by the driven gear of the output shaft will be directed in a second axial direction, which is substantially opposite to said first axial direction. Hence, input and output shaft axial thrusts will be of opposite directions and applied to the same location, i.e. where the input and output shaft main thrust bearing arrangements are joined by the main thrust bearing support. Hence, such a gear unit may be used for carrying out the method described hereinbefore, and thereby relates to the same inventive concept. The difference in helix angles will operate so as to make the magnitudes of said thrusts more equal, so as to increase the extent to which said axial thrusts at least partly cancel each other out in the main thrust bearing support. The resultant force on the bearing support will thereby be limited. Thanks to the input and output shafts being arranged for applying their respective axial thrusts to the same, axially rigid location, axial movement of the shafts is reduced. This allows for tighter gearing backlash, which prolongs service life of the gear unit. Furthermore, reduced axial movement reduces so-called skidding, a phenomenon that will be described in more detail below. Similar to "substantially opposite directions", the term "substantially parallel" is to be construed as forming an angle of less than 15°.

According to an embodiment, said main thrust bearing support is fixed to a gear unit housing. Thereby, the main thrust bearing support may perform the additional function of providing radial support.

According to an embodiment, said input shaft main thrust bearing arrangement is arranged on a first side of said main thrust bearing support, and said output shaft main thrust bearing arrangement is arranged on a second side of said main thrust bearing support, said second side being opposite to said first side.

According to another aspect of the invention, parts or all of the above mentioned problems are solved, or at least mitigated, by a stationary gear unit comprising an input shaft, and an output shaft substantially parallel with said input shaft, the gear unit being configured for providing a transmission ratio between said input shaft and said output shaft via a layshaft arrangement, the input shaft being provided with a drive gear in mesh with a driven gear of said layshaft arrangement, and the output shaft being provided with a driven gear in mesh with a drive gear of said layshaft arrangement, the transmission ratio being non-unity such that one gear of the drive gear of the input shaft and the driven gear of the output shaft will be arranged for operating at a relatively lower torque, and the other gear will be arranged for operating at a relatively higher torque, said relatively higher torque being higher than said relatively lower torque; the input shaft being journalled to the output shaft in a main thrust bearing arrangement arranged for limiting axial movement of the input shaft relative to the output shaft in a first axial direction; said drive gear of said input shaft being helical of a first hand; said driven gear of said output shaft being helical of a second hand, said second hand being the same as the first hand for a positive transmission ratio and opposite to said first hand for a negative transmission ratio; and said gear arranged for operating at a relatively lower torque having a helix angle exceeding the helix angle of said gear arranged for operating at a relatively higher torque. In such a gear unit, when torque is supplied to the input shaft in a drive direction, axial thrust generated by the drive gear of the input shaft will be directed in said first axial direction, against said main thrust bearing arrangement. Axial thrust generated by the driven gear of the output shaft will be directed in a second axial direction, which is substantially opposite to said first axial direction. Hence, input and output shaft axial thrusts will be of opposite directions and applied to the same location, i.e. where the shafts are joined by the main thrust bearing arrangement. Such a gear unit may be used for carrying out the method described hereinbefore, and thereby relates to the same inventive concept. The difference in helix angles will operate so as to make the magnitudes of said thrusts more equal, so as to increase the extent to which said axial thrusts at least partly cancel each other out in said main thrust bearing arrangement. The resultant axial thrust acting on the input and output shafts will thereby be limited. Thanks to the input and output shafts being arranged for applying their respective axial thrusts to the same, axially non-yielding main thrust bearing arrangement, axial and radial movement of the shafts is reduced. This allows for tighter gearing backlash, which prolongs service life of the gear unit. Furthermore, reduced axial movement reduces rolling element skidding in the axial thrust bearings.

According to an embodiment, said input shaft is arranged on a first side of said main thrust bearing arrangement, and said output shaft is arranged on a second side of said main thrust bearing arrangement, said second side being opposite to said first side.

According to an embodiment of any of the gear units described hereinbefore, /each of/ said main thrust bearing arrangement/s is a bidirectional thrust bearing arrangement for limiting axial movement of the /respective/ input or output shaft in two axial directions. Thereby, axial forces cancel out in the main thrust bearing support or the main thrust bearing, as the case may be, regardless of the direction of rotation or input torque of the gear unit.

According to an embodiment of any of the gear units described hereinbefore, said input shaft is connected to a rotary power source for driving the input shaft in said driving direction of rotation, and the hand of said drive gear of said input shaft is oriented for applying input shaft axial thrust in said first axial direction when the rotary power source transmits torque to the input shaft in said driving direction. Implicitly, the axial thrust of the output shaft will thereby be applied in said second axial direction substantially opposite to said first axial direction. By having the gear unit connected to a rotary power source, for receiving rotary power primarily in said drive direction therefrom, it is possible to design the gear unit so as to withstand a larger torque in the predetermined driving direction than in a direction of rotation opposite to said driving direction. Thereby, weight may be saved and the construction may be simpler, since thrust bearing(s) may be unidirectional, and/or housing walls may be made thinner.

According to an embodiment of any of the gear units described hereinbefore, each of said input and output shafts is axially preloaded in a preloading arrangement. Each of said input and output shafts may be preloaded in a preload arrangement either between a pair of auxiliary preload bearings, or between a main thrust bearing arrangement and an auxiliary preload bearing. In the latter case, the main thrust bearing arrangement will have the double function of cancelling out dynamic axial loads, and acting as one of the preload bearings of a preloading arrangement. The auxiliary preload bearings may be located e.g. at the respective end walls of a gear unit housing. By directing the dynamic axial thrust to a single, axially rigid location, where the thrusts at least partly cancel out when the gear unit is driven in a forward, high-load drive direction, the magnitude of the preload force can be selected more freely and with a higher accuracy. In the case of tapered roller bearings, an accurate axial preloading reduces skidding and brings a greater portion of a bearing's rolling elements in contact with bearing inner and outer races during a greater portion of each turn of the respective shaft, thereby sharing the axial load more accurately between the rolling elements. For this reason, a correctly preloaded thrust bearing generally has a longer life expectancy than a non-preloaded thrust bearing. However, a too highly preloaded thrust bearing generally has a shorter life expectancy than a non-preloaded bearing. By cancelling out a significant portion of the dynamic axial forces, the preload of the shafts can be kept on a lower, more constant, and more accurately selectable level. Furthermore, any housing or support structure carrying the preload thrust bearings may be dimensioned rigid enough for the static preload, without becoming excessively heavy as it would have been if required to take up heavy dynamic axial thrusts originating from operation of helical gears as well. It also becomes possible to arrange the preload thrust bearings in a flexible support so as to provide a selected, constant axial preloading force. Still further, axial preloading also to some extent reduces the axial and radial movement of the respective shafts, thereby prolonging service life expectancy.

According to an embodiment of any of the gear units described hereinbefore, said input and output shafts are substantially concentric. Thereby, a minimum of transversal torque will act on the main thrust bearing/main thrust bearing support/, and minimum of bending force will act on the output shaft. Throughout this disclosure, "substantially concentric" is to be construed as a central axis of at least one of the input shaft and the output shaft extending through a surface defined by the outer boundaries of a thrust bearing supporting the other shaft.

According to an embodiment of any of the gear units described hereinbefore, said drive gear of said input shaft has an input shaft drive gear pitch diameter $D_{in}$ and an input shaft drive gear helix angle $\psi_{in}$;
said driven gear of said output shaft has an output shaft driven gear pitch diameter $D_{out}$ and an output shaft driven gear helix angle $\psi_{out}$; and
said drive gear of said input shaft and said driven gear of said output shaft satisfy a condition corresponding to $$0.2 < \left| I_{tot} \frac{D_{in} \tan \Psi_{out}}{D_{out} \tan \Psi_{in}} \right| < 5,$$

wherein $I_{tot}$ is the transmission ratio of said gear unit. Thereby, the resultant axial force is even further reduced. Preferably, $$0.5 < \left| I_{tot} \frac{D_{in} \tan \Psi_{out}}{D_{out} \tan \Psi_{in}} \right| < 2,$$

such that input and output axial thrusts to an even greater extent cancel out in the main thrust bearing or the main thrust bearing support, as the case may be.

According to an embodiment of any of the gear units described hereinbefore, said layshaft arrangement comprises a plurality of substantially parallel layshafts connected in series, each layshaft being provided with a helical driven gear and a helical drive gear, the drive gear of each layshaft being of the same hand as the driven gear of the same layshaft. Thereby, axial thrusts of each layshaft at least partly cancel out as a compressive or tensile axial force within each respective layshaft. Preferably, for each layshaft i of said plurality of layshafts, the respective driven gear has a driven gear pitch diameter $D_{driven, i}$ and a driven gear helix angle $\psi_{driven, i}$; the respective drive gear has a drive gear pitch diameter $D_{drive, i}$ and a drive gear helix angle $\psi_{drive, i}$, the drive gear helix angle $\psi_{drive, i}$ being different from the driven gear helix angle $\psi_{driven, i}$; and $$0.2 < |(D_{drive,i} * \tan \psi_{driven,i})/(D_{driven,i} * \tan \psi_{drive,i})| < 5$$

Under this particular condition, the axial thrust components acting on each layshaft cancel each other out to an even greater extent. Even more preferably, $$0.5 < |(D_{drive,i} * \tan \psi_{driven,i})/(D_{driven,i} * \tan \psi_{drive,i})| < 2,$$

such that most of the axial thrust components acting on each layshaft cancel out. It will be appreciated that $\psi_{driven, i}$ does not need to be identical to $\psi_{drive, i-1}$; such may be the case e.g. if the respective shafts are not exactly parallel.

According to an embodiment of any of the gear units described hereinbefore, said gear unit is a step-up gear. And according to an embodiment of any of the gear units described hereinbefore, said gear unit has a transmission ratio, between said input shaft and said output shaft, of less than 1/20. The gear unit designs disclosed herein are particularly well suited for the large input torques of a step-up gear and/or a high-transmission ratio gear unit.

According to an embodiment of any of the gear units described hereinbefore, said gear unit has a fixed transmission ratio. Such a design is relatively compact and reliable, making it particularly well suited for industrial applications and for power generation, e.g. in wind turbines. According to an embodiment, said gear unit is connected between a rotor and a generator of a wind turbine.

According to an embodiment, the drive gear of the input shaft is axially fixed to the input shaft, and the driven gear of the output shaft is axially fixed to the output shaft.

According to an embodiment, for each layshaft of said layshaft arrangement, the drive gear of the layshaft is axially fixed relative to the driven gear of the layshaft.

According to an embodiment, for each shaft of said gear unit, the angular shaft play $\theta_S$ relative to another shaft of said gear unit satisfies the condition $$\theta_S < \tan^{-1}(0.11/n_G)$$

wherein $n_G$ represents the number of teeth of a gear of said shaft, said gear being in engagement with a gear of said another shaft.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein:

FIG. 8b is a schematic cross-section side view, taken along the line B-B, of the gear unit of FIG. 8a.

DETAILED DESCRIPTION OF THE EXEMPLARY EMBODIMENTS

Wind turbine gear units of prior art, which are generally of the planetary gear type, have a few weaknesses. By way of example, in order to provide a reasonably even distribution of the load between the planet gears, while maintaining reasonably achievable requirements on manufacturing tolerances, at least the sun wheel is generally allowed to self-align in the radial direction. As helical gears are generally used for minimizing wind turbine noise, the shafts of a gear unit are subjected to axial thrust, which is taken up by thrust bearings in the gear unit housing. The rotor shaft typically transmits very high levels of torque to the gear unit; hence, the radial and axial load on the input shaft bearings may, in a typical gear unit, be very high. The high load may cause the gear unit housing to flex or yield, leading to increased axial bearing play and requiring substantial gearing backlash. Such axial play may limit the lifetime of the turbine; hence, the gear unit housing needs to be designed to take up substantial forces.

The direction of axial thrust varies with the load condition on the gear unit; therefore, axially unconstrained shafts may translate in the axial direction depending on the wind turbine load. This is a particular problem when the load direction is undefined, i.e. the wind speed is such that the gear unit is barely loaded. Such condition may occur e.g. when the wind speed decreases at a rate corresponding to the natural deceleration rate of the wind turbine, based on the friction and angular momentum of all rotating parts. Such a load condition increases the rate of axial back-and-forth movements of shafts within their axial clearances, which may cause rolling elements of roller bearings to stop and break through the lubricating film. Thereby, the roller bearings may break down prematurely. Furthermore, within a bearing, a loss of contact between rolling elements and a race surface may result in intermittent, skidding contact between race surface and rolling elements. This phenomenon is called skidding, and may increase bearing wear. Still further, alternating torsion transients, occurring due to substantial backlash, i.e. clearance between the teeth of meshing gears, also contribute to shorten the lifetime of a typical gear unit.

Figure 1:
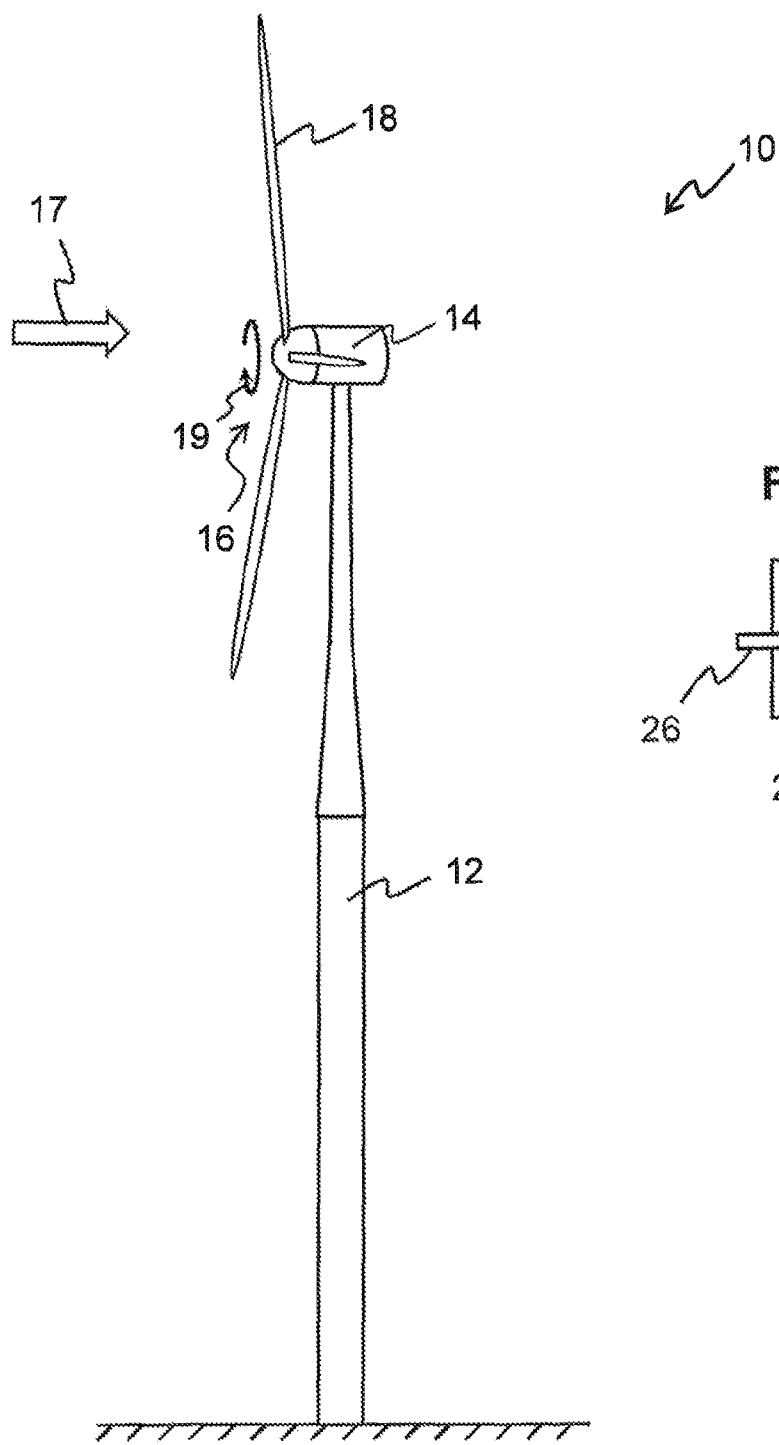
FIG. 1 is a schematic view in perspective of a wind turbine.

FIG. 1 schematically illustrates a wind turbine 10 comprising a wind turbine tower 12 and a nacelle 14. A rotor 16, comprising wings 18, is connected to the nacelle 14. Wind 17, which may vary in intensity and direction, drives the rotor 16, such that the rotor turns about e.g. a horizontal axis in a rotor driving direction 19. A typical rotation speed of the wind turbine rotor 16 may, by way of example, be between 5 and 30 rpm.

Figure 2:
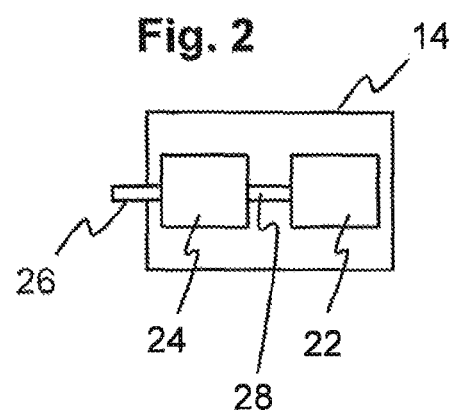
FIG. 2 is a schematic side view in section of the nacelle of the wind turbine of FIG. 1.

FIG. 2 schematically illustrates the interior of the nacelle 14. The rotor 16 (FIG. 1) is connected to a generator 22 via a gear unit 24, which steps up the low rotation speed of the rotor 16 to a higher speed of the generator 22. A gear unit input shaft 26 interconnects the rotor 16 with the gear unit 24, and provides a low-speed, high-torque rotary motion, in said driving direction 19 (FIG. 1), to the gear unit 24. A gear unit output shaft 28 interconnects the gear unit 24 with the generator 22, and provides a high-speed, low-torque rotary motion to the generator 22, which converts the rotary motion to electrical power for distribution to e.g. an electrical power distribution grid (not shown).

A typical generator 22 may, by way of example, be designed for operating at a rotation speed of between 500 and 5000 rpm (revolutions per minute), and more typically between 1000 and 2000 rpm. Hence, the total transmission ratio $I_{tot}$ of the gear unit 24, defined as the signed rotation speed of the input shaft 26 divided by the signed rotation speed of the output shaft 28, is preferably less than 1/20 (i.e. less than 0.05), and is more preferably between 1/50 and 1/200. Some wind turbines 10 may be designed to operate at a fixed speed of the generator 22, such as 1500 rpm, and the pitch of the wind turbine wings 18 is controlled, based on the speed and direction of the wind 17, so as to obtain 1500 rpm at the output shaft 28. Some wind turbines 10 may be provided with means for frequency control at the generator 22, such that the generator 22 will compensate for fluctuations in the speed of the rotor 16.

A wind turbine 10 puts particular requirements on the mechanical stability of the gear unit 24. By way of example, a typical wind turbine gear unit 24 may transmit a power in the range 1-10 MW. The torque on the input shaft 26 of a wind turbine gear unit 24 may typically exceed 100 kNm.

Figure 3:
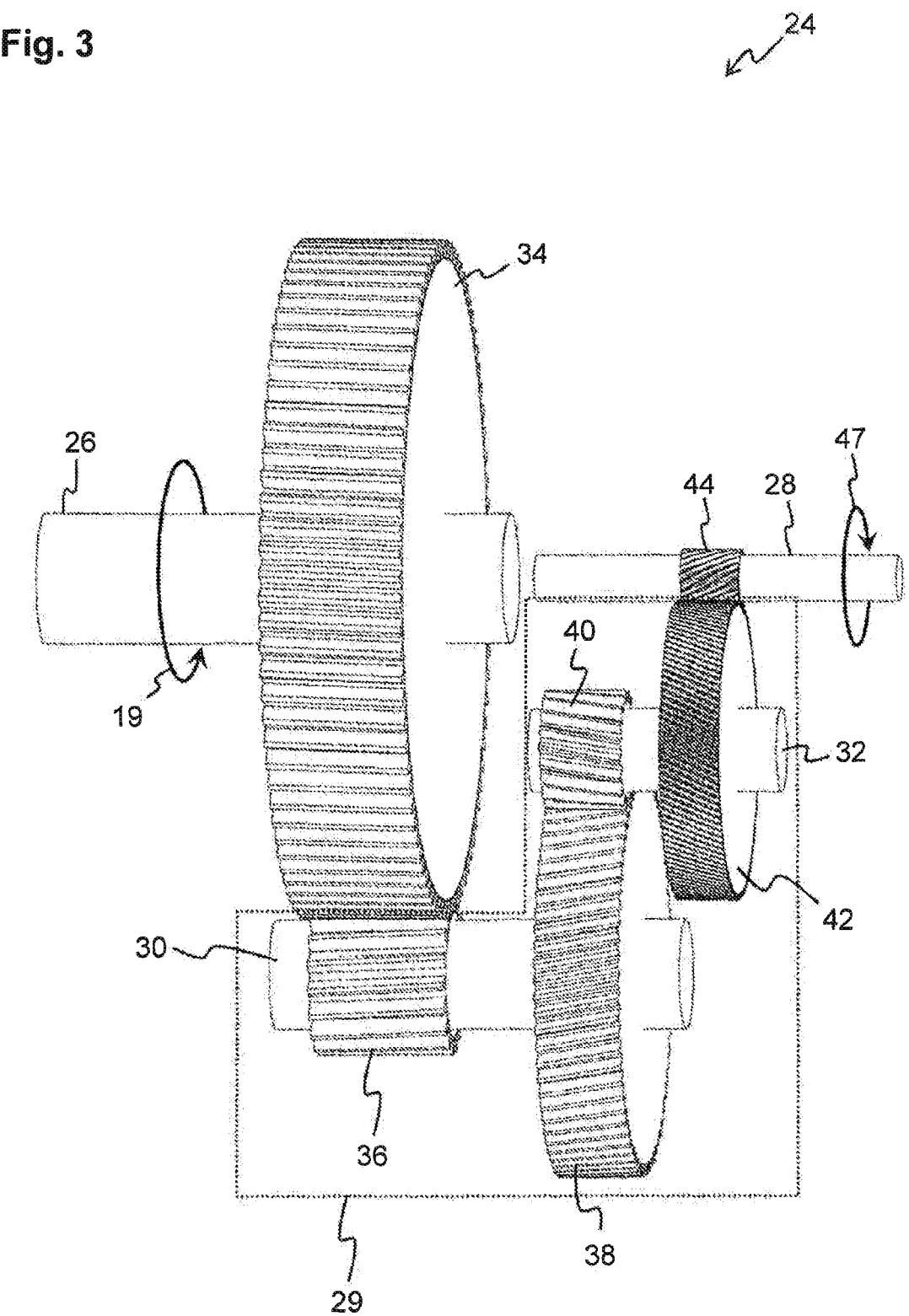
FIG. 3 is a schematic view in perspective of gearing of a stationary gear unit.

FIG. 3 illustrates the gearing of the gear unit 24 in greater detail. The input shaft 26 is connected to the output shaft 28 via a layshaft arrangement 29 comprising a first layshaft 30 and a second layshaft 32, which are connected in series. The input shaft is provided with a drive gear 34, which is in mesh with a driven gear 36 on the first layshaft. The drive gear 34 of the input shaft 26 has a larger pitch diameter $D_{in}$ than the corresponding pitch diameter $D_{driven,\ 1}$ of the driven gear 36 of the first layshaft 30, such that the engagement of the drive gear 34 of the input shaft 26 with the driven gear 36 of the first layshaft 30 provides a first step-up, of transmission ratio of the rotary speed from the input shaft 26 to the first layshaft 30.

The first layshaft 30 is provided with a drive gear 38, which is in mesh with a driven gear 40 on the second layshaft 32. The drive gear 38 of the first layshaft 30 has a larger pitch diameter $D_{drive,\ 1}$ than the corresponding pitch diameter $D_{driven,\ 2}$ of the driven gear 40 of the second layshaft 32, such that the engagement of the drive gear 38 of the first layshaft 30 with the driven gear 40 of the second layshaft 32 provides a second step-up, of transmission ratio $I_2$, of the rotary speed from the first layshaft 30 to the second layshaft 32.

The second layshaft 32 is provided with a drive gear 42, which is in mesh with a driven gear 44 on the output shaft 28. The drive gear 42 of the second layshaft 32 has a larger pitch diameter $D_{drive,\ 2}$ than the corresponding pitch diameter $D_{out}$ of the driven gear 44 of the output shaft 28, such that the engagement of the drive gear 42 of the second layshaft 32 with the driven gear 44 of the output shaft 28 provides a third step-up, of transmission ratio $I_3$, of the rotary speed from the second layshaft 32 to the output shaft 28. Hence, the gear unit 24 comprises three gear steps of transmission ratios $I_2$, $I_3$, which provide a total transmission ratio $I_{tot}=I_1*I_2*I_3$ from the input shaft 26 to the output shaft 28.

Figure 4:
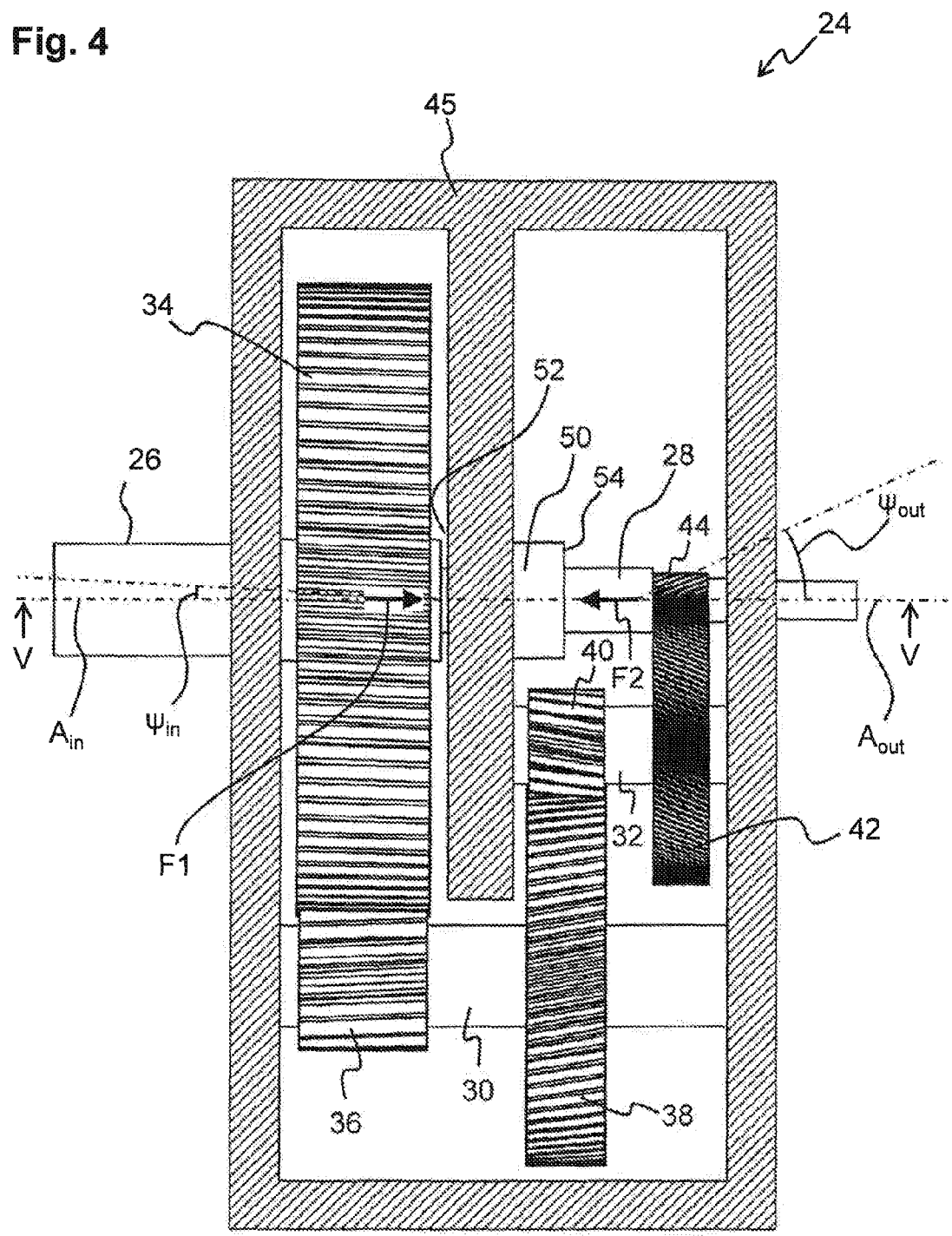
FIG. 4 is a schematic top view in section of a stationary gear unit comprising the gearing of FIG. 3.

FIG. 4 illustrates the gear unit 24 arranged in a gear unit housing 45.

The drive gear 34 of the input shaft 26 is a helical gear of a first hand, said first hand in this example being right hand, right hand being defined as the teeth twisting clockwise as they recede from an observer looking along the axis $A_{in}$ of the drive gear 34 of the input shaft 26. The drive gear 34 of the input shaft 26 further has a helix angle $\psi_{in}$, defined as the unsigned value of the angle formed between a tangent to the gear's helix at the pitch circle, and the direction of the central axis $A_{in}$ of the input shaft drive gear 34.

The driven gear 44 of the output shaft 28 is a helical gear of a second hand, said second hand in this example being left hand, defined as the teeth twisting counter-clockwise as they recede from an observer looking along the axis $A_{out}$ of the driven gear 44 of the output shaft 28. The driven gear 44 of the output shaft 28 further has a helix angle $\psi_{out}$, defined as the unsigned value of the angle formed between a tangent to the gear's helix at the pitch circle, and the direction of the central axis $A_{out}$ of the output shaft driven gear 44. The same definition of helix angle applies, mutatis mutandis, to the other helical gears of the gear unit 24.

When the input shaft 26 is rotated in the driving direction 19 (FIG. 3), said driving direction being clockwise, as seen in the direction of the central axis $A_{in}$ of the input shaft 26 towards the output shaft 28, the helical drive gear 34 of the input shaft 26, which is axially fixed to the input shaft 26, will generate an axial thrust F1 acting on the input shaft 26. Due to the hand of the drive gear 34 of the input shaft 26, the axial thrust F1 will be directed towards the output shaft 28.

The driven gear 44 of the output shaft 28, which, via said first and second layshafts 30, 32, will be rotated in an output direction 47 (FIG. 3) opposite to the driving direction 19, will generate an axial thrust F2. The driven gear 44 of the output shaft 28 is axially fixed to the output shaft 28, such that the axial force F2 will act on the output shaft 28. Due to the hand of the driven gear 44 of the output shaft 26, the axial thrust F2 will be directed towards the input shaft 26. The directions of the axial thrusts F1, F2 are illustrated by arrows.

The input shaft 26 and the output shaft 28 are concentric, and meet at a main thrust bearing support 50. At the main thrust bearing support 50, the input and output shafts 26, 28 are journalled in a manner which will be described in more detail further below. The main thrust bearing support 50 is fixed to the gear unit housing 45 in a non-rotating manner, and in this particular example forms a bracket for holding the input shaft 26 on a first, input side 52 thereof, and the output shaft 28 on a second, output side 54 thereof. The input side 52 of the main thrust bearing support 50 is opposite to the output side 54.

The main thrust bearing support 50 forms an axially rigid support structure, at which the input and output shafts 26, 28 are journalled so as to transfer the axial thrusts F1, F2 thereto. Thanks to the respective hands of the drive gear 34 of the input shaft 26, and of the driven gear 44 of the output shaft 28, being oriented such that the respective axial thrusts F1, F2 are directed in opposite directions, the axial thrusts F1, F2 will thereby at least partly cancel out in the main thrust bearing support 50. This reduces movement of the input and output shafts 26, 28 and their associated gears 34, 44, which in turn allows for tighter gearing backlash. And thanks to the input and output shafts 26, 28 being concentric, the axial thrusts F1, F2 will not result in any substantial transversal torque or bending force onto the main thrust bearing support 50, or onto the shafts 26, 28 themselves.

When torque is supplied to the input shaft 26 in the drive direction 19 (FIG. 3), the axial thrusts F1, F2 cancel out as a compressive force where the input and output shafts 26, 28 meet in the main thrust bearing support 50. During normal operation of a wind turbine 10 (FIG. 1), the average and instantaneous torque supplied to the gear unit 24 is typically larger in the drive direction 19 than in the opposite direction. Hence, the gear unit 24 does not necessarily need to be arranged for taking up heavy axial thrusts in the opposite directions, i.e. thrusts acting so as to urge the input shaft 26 away from the output shaft 28.

According to the definition of transmission ratio $I_{tot}$ hereinbefore, opposite directions of rotation of the input shaft 26 and the output shaft 28 will yield a negative total transmission ratio $I_{tot}$. As a general rule, in order to generate an output shaft axial thrust F2 in a direction opposite to the input shaft axial thrust F1, the second hand, said second hand being the hand of the output shaft 28, should be the same as the first hand, said first hand being the hand of the input shaft 26, for an even number of layshafts connected in series between the input shaft 26 and the output shaft 28. For an odd number of layshafts connected in series between the input shaft 26 and the output shaft 28, the second hand should be the same as the first hand. Furthermore, for a clockwise drive direction 19 of the input shaft 26, as seen in the axial direction towards the output shaft 28, a right-hand drive gear 34 of the input shaft 26 should be selected for obtaining axial thrusts F1, F2 that meet at the main thrust bearing support 50. For a counter-clockwise drive direction 19 of the input shaft 26, a left-hand drive gear 34 of the input shaft 26 should be selected for obtaining axial thrusts F1, F2 that meet at the main thrust bearing support 50.

Preferably, the drive gear 34 of the input shaft 26 and the driven gear 44 of the output shaft 28 satisfy the condition $$0.2 < \left| I_{tot} \frac{D_{in} \tan \Psi_{out}}{D_{out} \tan \Psi_{in}} \right| < 5 \tag{1}$$

It has been found that if this condition is satisfied, a significant portion of the axial thrusts F1, F2 of the input and output shafts 26, 28 cancel out.

More preferably, $$0.5 < \left| I_{tot} \frac{D_{in} \tan \Psi_{out}}{D_{out} \tan \Psi_{in}} \right| < 2, \tag{2}$$

and ideally, $$\left| I_{tot} \frac{D_{in} \tan \Psi_{out}}{D_{out} \tan \Psi_{in}} \right| \approx 1, \tag{3}$$

such that there is an almost complete axial thrust balance between F1 and F2. Thereby, the axial load exerted by the input and output shafts 26, 28 onto the axial end walls of the gear unit housing 45 can be essentially eliminated. As is apparent to those skilled in the art, the expressions (1)-(3) above may also be adjusted so as to compensate for the friction of the gear unit 24.

As a specific example fulfilling all the above conditions, for the gear unit 24 having a total transmission ratio $I_{tot}$ of 1/100, the drive gear of the input shaft 26 may have a pitch diameter $D_{in}$ of 2500 mm (millimeters) and a helix angle $\psi_{in}$ of 2.5°, whereas the driven gear 44 of the output shaft 28 may have a pitch diameter $D_{out}$ of 200 mm and a helix angle $\psi_{out}$ of 20°.

In order to achieve a minimum total axial load onto the gear unit housing 45, also the layshafts 30, 32 of the layshaft arrangement 29 (FIG. 3) may be axially balanced. This may be achieved by each of the layshafts 30, 32 being equipped with a respective drive gear and a respective driven gear of the same hand, preferably with a larger helix angle on its respective larger pitch diameter gear than on its respective smaller pitch diameter gear. In the exemplary gear unit 24 of FIG. 4, the driven gear 36 of the first layshaft 30 has a driven gear helix angle $\psi_{driven,1}$, and the drive gear 38 has a drive gear helix angle $\psi_{drive,1}$ of the same hand as the driven gear 36. Thereby, when the input shaft 26 is rotated in said driving direction 19, at least a portion of the axial thrusts generated by the helical gears 36, 38 of the first layshaft 30 will cancel out as a tensile force in the first layshaft 30. The pitch diameter $D_{driven,1}$ of the driven gear 36 is larger than the pitch diameter $D_{drive,1}$ of the drive gear 38; hence, the drive gear helix angle $\psi_{drive,1}$ preferably exceeds the driven gear helix angle $\psi_{driven,1}$, such that axial balance is still further improved.

Preferably, for each layshaft i of a layshaft arrangement, $$0.2 < |(D_{drive,i} * \tan \psi_{driven,i})/(D_{driven,i} * \tan \psi_{drive,i})| < 5, \tag{4}$$

where, in the specific embodiment of FIG. 4, i=1 represents the respective properties $D_{driven,1}$, $\psi_{driven,1}$, $D_{drive,1}$, and $\psi_{drive,1}$ of the first layshaft 30, and i=2 represents the respective properties of the second layshaft 32.

More preferably, $$0.5 < |(D_{drive,i} * \tan \psi_{driven,i})/(D_{driven,i} * \tan \psi_{drive,i})| < 2, \tag{5}$$

and ideally, $$|(D_{drive,i} * \tan \psi_{driven,i})/(D_{driven,i} * \tan \psi_{drive,i})| \approx 1. \tag{6}$$

Under those conditions, the layshafts may be completely balanced in the axial direction, and their journaling may be thrust bearing free, i.e. they may be journalled for substantive support only in the radial direction.

As a specific example fulfilling all the above conditions, for the gear unit 24 of FIG. 3, the driven gear 36 of the first layshaft 30 may have a pitch diameter $D_{driven,1}$ of 550 mm and a helix angle $\psi_{driven,1}$ of 2.5°; the drive gear 38 of the first layshaft 30 may have a pitch diameter $D_{drive,1}$ of 1500 mm and a helix angle $\psi_{drive,1}$ of 7°; the driven gear 40 of the second layshaft 32 may have a pitch diameter $D_{driven,2}$ of 400 mm and a helix angle $\psi_{driven,2}$ of 7°; and the drive gear 42 of the second layshaft 32 may have a pitch diameter $D_{drive,2}$ of 1100 mm and a helix angle $\psi_{drive,2}$ of 20°.

Figure 5A:
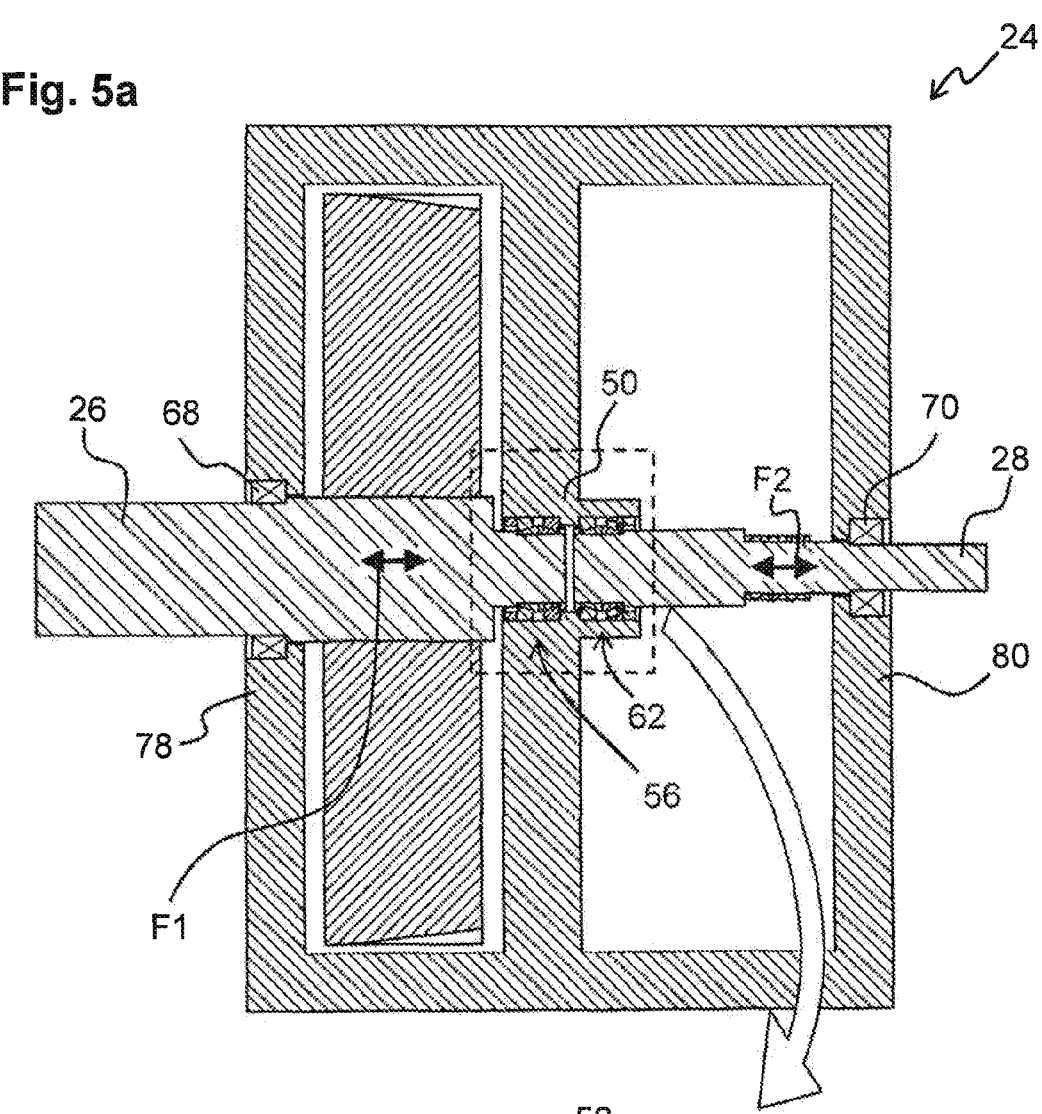
FIG. 5a is schematic cross-section side view, taken along the line V-V, of the gear unit of FIG. 4.
Figure 5B:
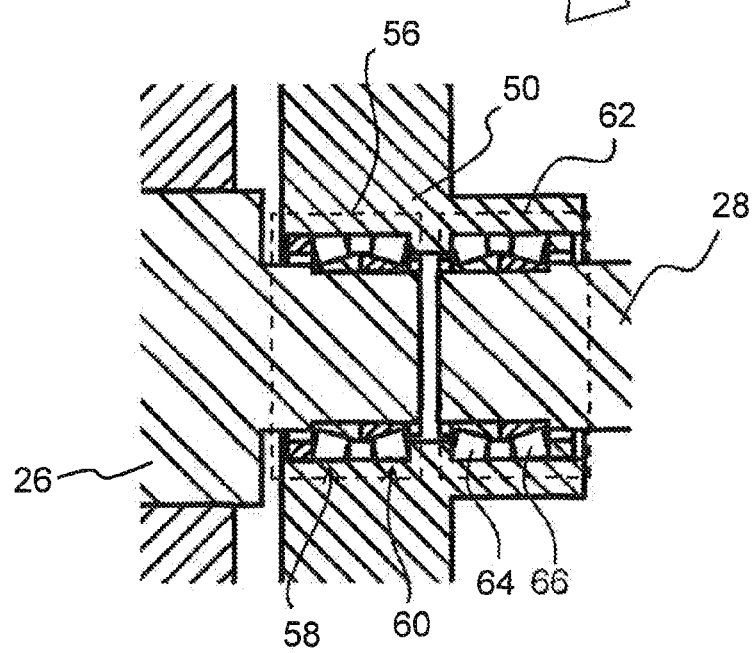
FIG. 5b is a magnified view of the area of FIG. 5a defined by a dashed rectangle.

FIG. 5a, showing the section V-V along the central axis $A_{in}$ of FIG. 4, illustrates an exemplary journaling of the input and output shafts 26, 28, and the magnified view of FIG. 5b illustrates the details of how the shafts 26, 28 are journalled to the main thrust bearing support 50. The input shaft 26 is journalled to the main thrust bearing support 50 in an input shaft main thrust bearing arrangement 56, which comprises a first thrust bearing, embodied as a first tapered roller bearing 58, and a second thrust bearing, embodied as a second tapered roller bearing 60. The two tapered roller bearings 58, 60 taper in opposite directions, such that they together form a bidirectional thrust bearing arrangement, i.e. the input shaft thrust bearing arrangement 56 is adapted for supporting substantial axial loads in both axial directions.

Similarly, the output shaft 28 is journalled to the main thrust bearing support 50 in an output shaft main thrust bearing arrangement 62, which also comprises two tapered roller bearings 64, 66 tapering in opposite directions, thereby forming a bidirectional thrust bearing arrangement. The input and output main thrust bearing arrangements 56, 62 are co-located on the main thrust bearing support 50, which interconnects said main thrust bearing arrangements 56, 62 in an axially rigid manner.

Thanks to the input and output shaft main thrust bearing arrangements 56, 62 being bidirectional, when torque is supplied to the input shaft 26 in a direction opposite to said drive direction 19, the axial thrusts F1, F2 cancel out as a tensile force in the main thrust bearing support 50. Thereby, axial loads onto axial end walls 78, 80 of the gear unit housing 45 are reduced regardless of the direction of operation or the load direction of the input shaft 26.

An auxiliary bearing 68 supports the input shaft 26 in the radial direction. Since the input shaft main thrust bearing arrangement 56 is bidirectional and provides all axial support that is needed, the auxiliary bearing 68 does not need to be arranged for providing any axial support. Hence, the auxiliary bearing 68 may be a simple, radially supporting bearing of e.g. the cylindrical, non-tapered roller bearing type.

Alternatively, also the auxiliary bearing 68 may be an axial thrust bearing, e.g. of the tapered roller bearing type, which supports the input shaft 26 in an axial direction. Thereby, the auxiliary bearing 68 may be used as a preload bearing for axially preloading the input shaft 26 between the auxiliary bearing 68 and the input shaft main thrust bearing arrangement 56. In such a configuration, the auxiliary bearing 68 and the input shaft thrust bearing arrangement 56 together form a preloading arrangement, which may permanently keep the input shaft 26 under tensile or compressive load. Thereby, the lifetime of the input shaft main thrust bearing arrangement 56 may be extended. Furthermore, a minimum of backlash can be designed into the mating of the teeth of the gears of the gear unit 24, such that the operational lifetime of the entire gear unit 24 is increased.

Also the output shaft 28 may be preloaded in a preloading arrangement formed by an auxiliary axial thrust bearing 70 and the output shaft main thrust bearing arrangement 62. It is also possible to accurately preload the layshafts 30, 32, which may be axially balanced in line with what has been described hereinbefore with reference to FIG. 4, in similar preloading arrangements of thrust bearings.

Figure 6A:
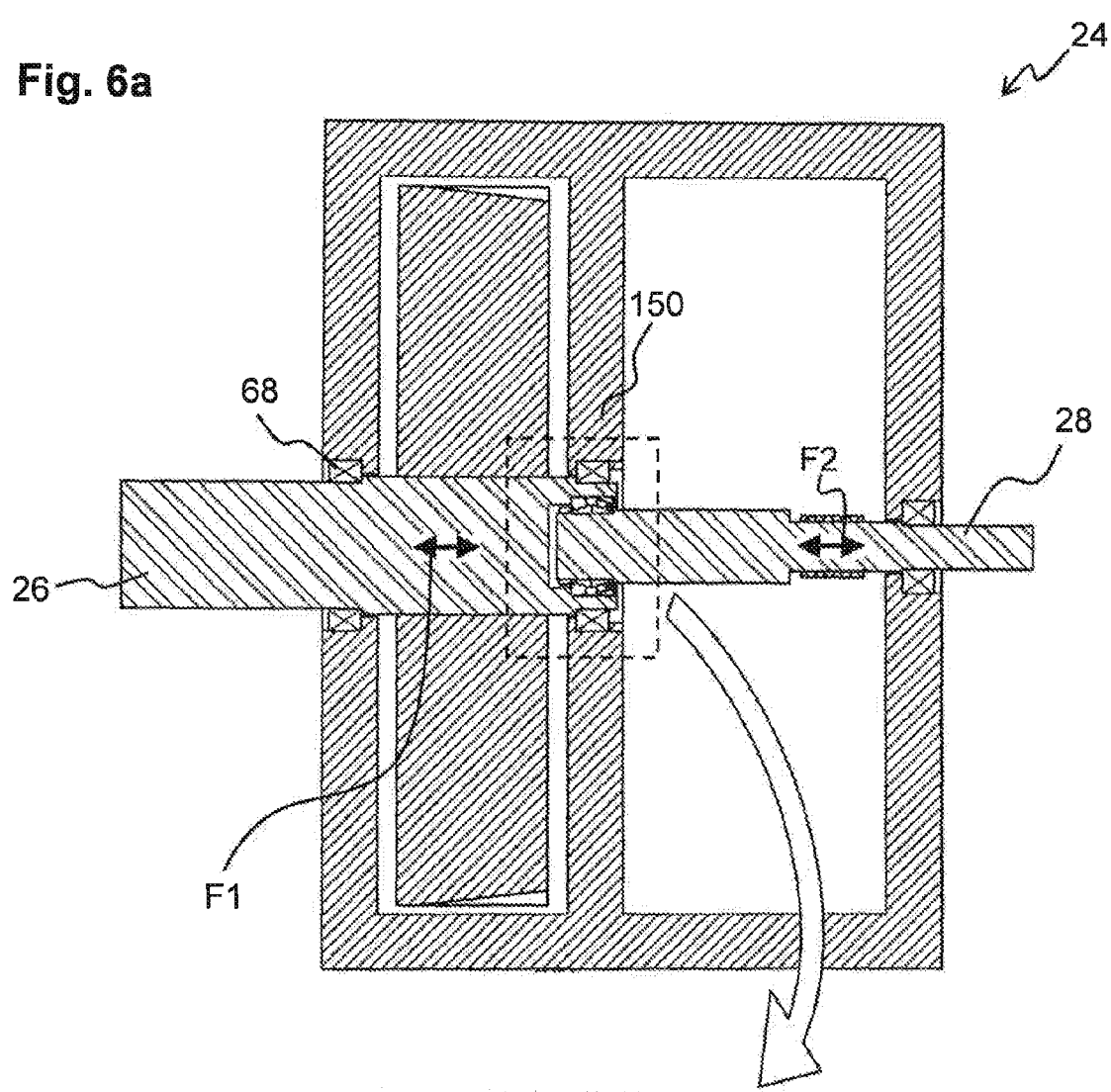
FIG. 6a is schematic cross-section side view of a second embodiment of a gear unit.
Figure 6B:
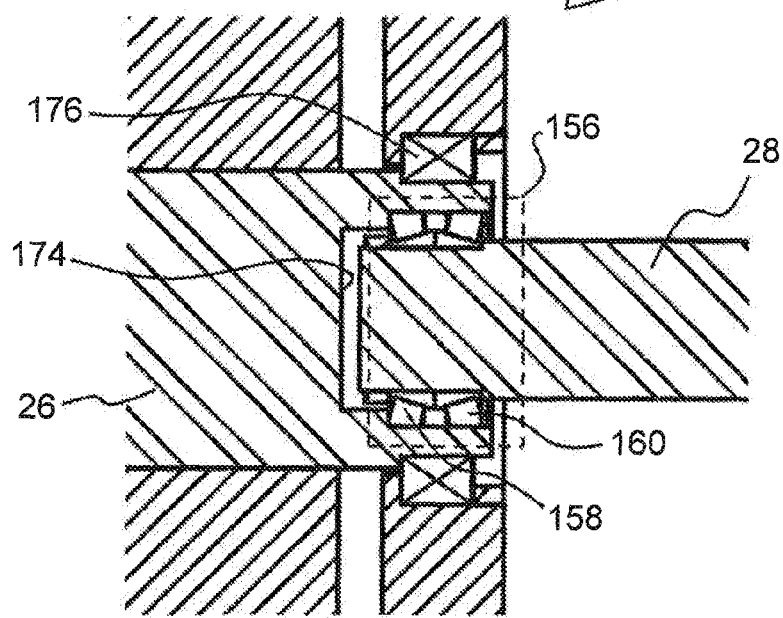
FIG. 6b is a magnified view of the area of FIG. 6a defined by a dashed rectangle.

FIG. 6a-b illustrate an alternative configuration of the bearings of the gear unit 24, according to which configuration the input shaft 26 and the output shaft 28 are arranged for transferring axial thrusts F1, F2 more directly to each other. In the particular example illustrated in FIG. 6a-b, the output shaft 28 is journalled to the input shaft 26 via a main thrust bearing arrangement 156, which allows the input and output shafts 26, 28 to rotate independently of each other. The main thrust bearing arrangement 156 comprises a first tapered roller bearing 158 and a second tapered roller bearing 160, which are arranged in an axial recess 174 of the input shaft 26. The two tapered roller bearings 158, 160 taper in opposite directions, such that they together form a bidirectional thrust bearing arrangement. Thereby, the axial thrusts F1, F2 of the input and output shafts 26, 28 meet and at least partly cancel each other out at the main thrust bearing arrangement 156 irrespective of the driving direction of the input shaft 26. The main thrust bearing arrangement 156 thereby forms an axially rigid support structure for non-yieldingly receiving axial loads from both the input shaft 26 and the output shaft 28.

The input shaft 26 is journalled in an auxiliary bearing 176, which is mounted on a bearing support 150. The auxiliary bearing 176 does not need to be a thrust bearing, since axial thrust will mainly be borne by the main thrust bearing arrangement 156. Similar to what has been described above with reference to FIG. 5a-b, however, the auxiliary bearing 176 may, as an alternative, be a thrust bearing that can be used for preloading the input shaft 26 against e.g. a second auxiliary bearing 68.

Neither the bearing support 150 nor the auxiliary bearing 176 mounted thereto are necessary for balancing the dynamic axial thrusts that occur when operating the gear; hence, they can be dispensed with, and radial support may be provided by other means available to the person skilled in the art.

As an alternative to incorporating into the gear unit 24 a main thrust bearing arrangement 156 that is bidirectional, for a gear unit that is intended for an application in which it is mainly exposed to high torques in a single, predetermined driving direction 19 (FIG. 3), it would be sufficient to use a unidirectional main thrust bearing arrangement as has been described in the foregoing.

Figure 7A:
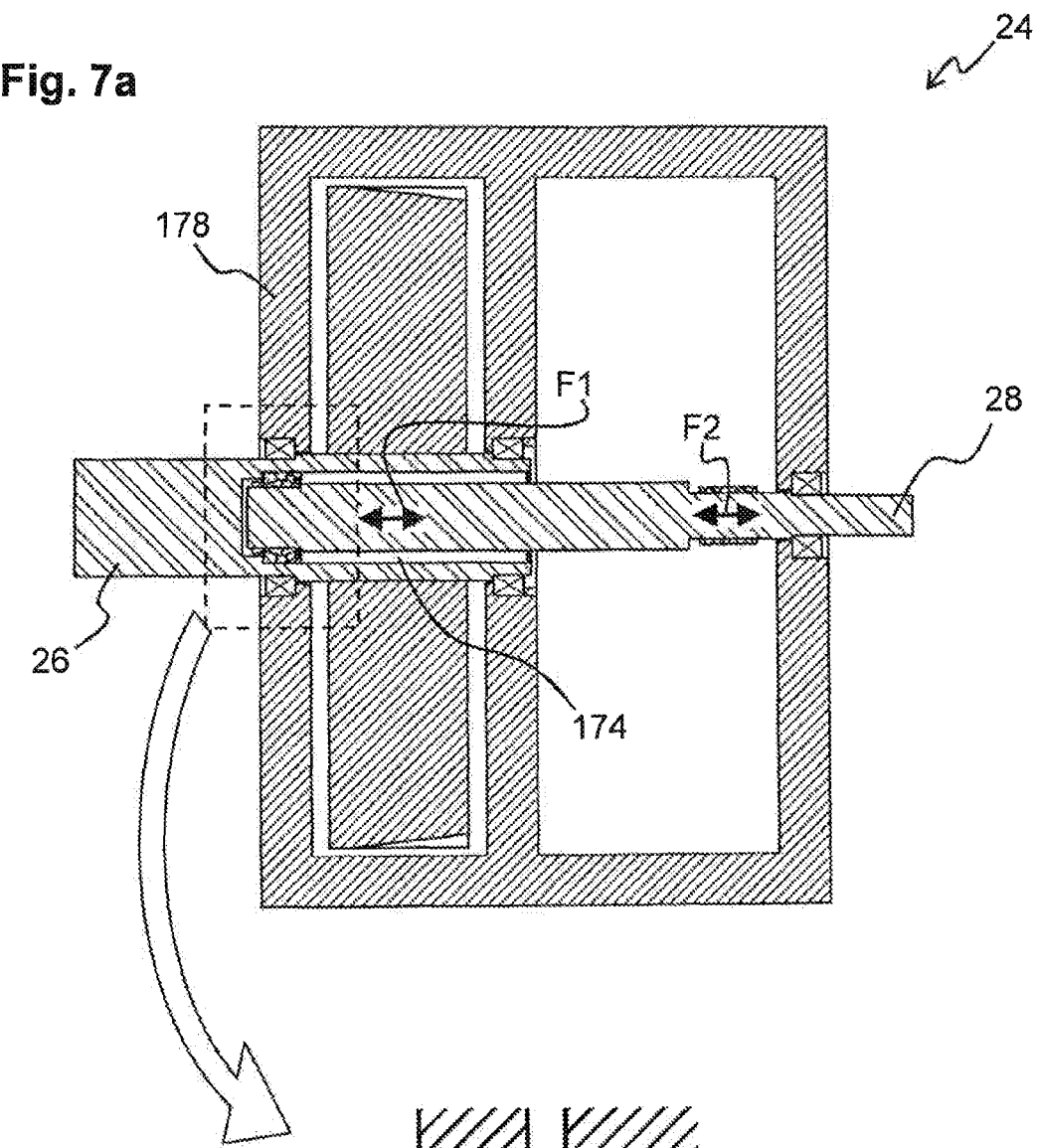
FIG. 7a is schematic cross-section side view of a third embodiment of a gear unit.
Figure 7B:
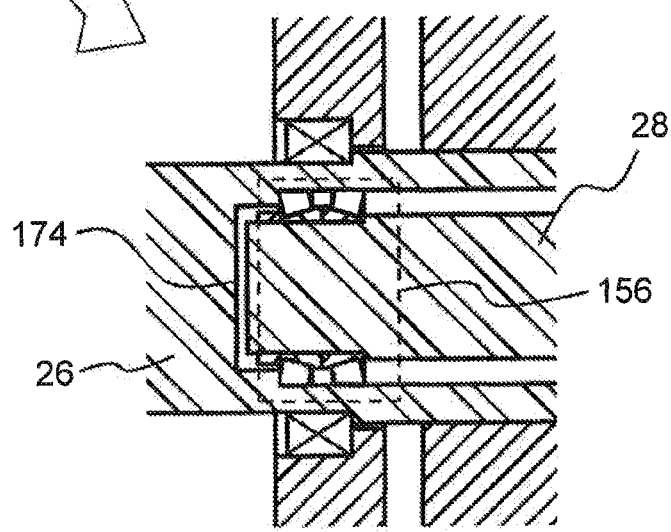
FIG. 7b is a magnified view of the area of FIG. 7a defined by a dashed rectangle.

FIG. 7a-b illustrate yet an alternative configuration of the bearings of the gear unit 24, according to which configuration the input shaft 26 is hollow, and the main thrust bearing arrangement 156 is located deep into the recess 174 of the input shaft 26. Even though, in FIG. 7a, the axial thrust F1 is illustrated on the output shaft 28, it will be appreciated that the thrust F1 acts on the hollow input shaft 26 surrounding the output shaft 28.

In the configuration of FIG. 7a-b, the input and output shafts are interconnected via a main thrust bearing arrangement 156, via which the axial thrusts F1, F2 of the shafts 26, 28 cancel out. However, as an alternative (not shown), the input shaft 26 may be journalled to the axial end wall 178 of the gear unit housing 45 in an input shaft main thrust bearing arrangement, which is configured to transfer axial thrust from the input shaft 26 to the axial end wall 178. Similarly, the output shaft 28 may be journalled to the same axial end wall 178 of the gear unit housing 45 in an output shaft main thrust bearing arrangement, which is configured to transfer axial thrust from the output shaft 28 to the axial end wall 178. In such a configuration, the axial end wall 178 of the gear unit housing 45 would form a main thrust bearing support similar to what has been described hereinbefore with reference to FIG. 5a-b. Such a configuration would however differ from the arrangement of FIG. 5a-b in that the drive gear 34 of the input shaft 26 and the driven gear 44 of the output shaft 28 would be located on the same side of the main thrust bearing support, such that one of the input and output shaft main thrust bearing arrangements would support an axially pushing force, while the other would support an axially pulling force, when the gear unit 24 is operated.

Figure 8A:
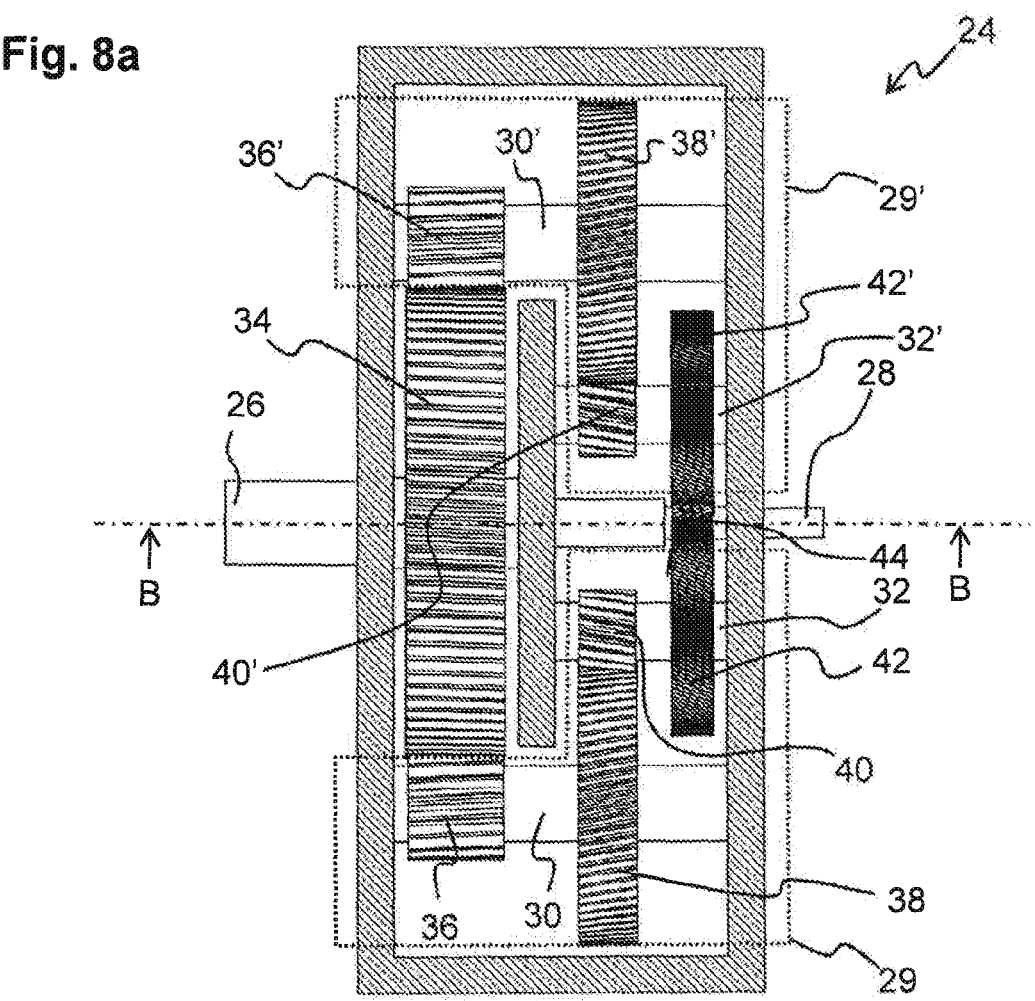
FIG. 8a is schematic cross-section top view of a fourth embodiment of a gear unit.
Figure 8B:
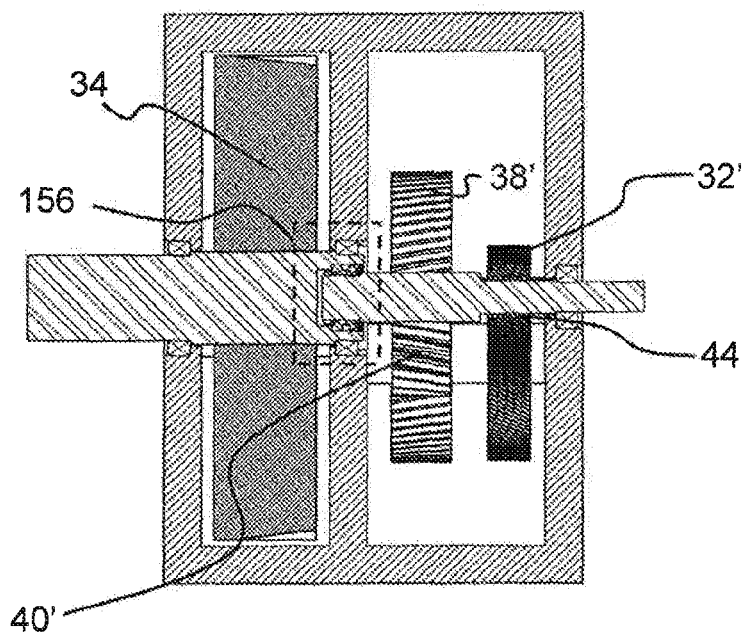

FIG. 8a-b illustrate an alternative configuration of the layshafts, according to which configuration the gear unit 24 comprises a first layshaft arrangement 29 and a second layshaft arrangement 29'. Each of the layshaft arrangements 29, 29' comprises a respective first layshaft 30, 30' provided with a driven gear 36, 36' and a drive gear 38, 38', and a respective second layshaft 32, 32', said second layshaft 32, 32' also being provided with a driven gear 40, 40' and a drive gear 42, 42'. The two layshaft arrangements 29, 29' are arranged in parallel and configured to provide an identical transmission ratio $I_{tot}$ between the input shaft 26 and the output shaft 28. The input and output shafts 26, 28, as well as the layshafts 30, 30', 32, 32' of the gear unit 24 will be axially balanced under the same conditions, defined by the appended claims, as any other of the embodiments disclosed hereinbefore with reference to FIGS. 1-7b. In the particular example illustrated in FIG. 8b, the axial loads of the input and output shafts 26, 28 at least partly cancel out in a main thrust bearing arrangement 156, in a manner similar to what has been described in the foregoing with reference to FIG. 6a-b.

Two parallel layshaft arrangements, which are in mesh with the same drive and driven gears 34, 44, respectively, of the input and output shafts 26, 28, are illustrated in FIG. 8a-b. However, the gear unit may also be provided with any other number of parallel layshaft arrangements, and the layshafts may be connected between different sets of drive gears of the input shaft 26, and driven gears of the output shaft 28; the general principles of axial thrust balancing disclosed herein will nevertheless apply.

In all embodiments described hereinbefore, the at least partial cancelling out of axial forces F1, F2 in an axially rigid support structure results in reduced movement of at least the input and output shafts 26, 28 and their associated gears 34, 44. This allows for a tighter backlash compared to what is possible to obtain in gear units of prior art. In other words, the gear unit 24 may be designed as a low-backlash gear unit. As a rule of thumb, the angular gear play $\theta_{G1}$ of a gear $G_1$ having $n_{G1}$ teeth, the gear $G_1$ mating with another gear $G_{G2}$, which is held fixed, may be obtained through the relation $$\theta_{G1} = \tan^{-1}(k/n_{G1}) \qquad (7)$$

wherein the number k is determinative of the angular play. As applied to an exemplary gear engagement of the gear unit 24 described hereinbefore, the angular gear play $\theta_{34}$ of the drive gear 34 of the input shaft 26, having $n_{34}$ teeth, may be obtained through the relation $$\theta_{34} = \tan^{-1}(k/n_{34}) \qquad (8)$$

assuming that the driven gear 36 of the first layshaft 30 is held immobile. Typically, a suitable angular gear play of each gear 34, 36, 38, 40, 42, 44, relative to its respective mating gear, is obtained for k<0.1. Hence, for a reasonably tight low-backlash gearbox, the majority, and preferably all of the gears 34, 36, 38, 40, 42, 44 of the gear unit 24 have an angular gear play $\theta_G$ fulfilling the relation $$\theta_G < \tan^{-1}(0.1/n) \qquad (9)$$

wherein n is the number of teeth of the respective gear. An even tighter low-backlash gearbox may be obtained provided that the majority, and preferably all of the gears 34, 36, 38, 40, 42, 44 of the gear unit 24 have an angular gear $\theta_G$ play fulfilling the relation $$\theta_G < \tan^{-1}(0.07/n) \qquad (10).$$

An axial play allowing a pair of shafts $S_1$, $S_2$, engaging via helical gears $G_1$, $G_2$, to move relative to each other results in an angular play between the shafts, since the relative axial translation of the shafts $S_1$, $S_2$ will make the gears $G_1$, $G_2$ turn in their helical engagement. Hence, a reduced axial movement of the shafts in a gear unit also directly results in a reduced angular play between the shafts.

For the pair of shafts $S_1$, $S_2$, the same rule of thumb may be applicable provided that the gears $G_1$, $G_2$ are axially fixed to their respective shaft $S_1$, $S_2$; the angular play $\theta_{S1}$ of the shaft $S_1$ relative to the shaft $S_2$ may be obtained through the relation $$\theta_{S1} = \tan^{-1}(k/n_{G1}) \qquad (11)$$

wherein the gear $G_1$ has $n_{G1}$ teeth, the number k again being determinative of the angular play.

For a gear unit 24 designed for at least partly balancing axial thrusts, and hence reducing axial movement, according to the guidelines disclosed herein, the angular shaft play $\theta_S$ of each shaft 26, 28, 30, 32, as connected to another shaft via mating gears, preferably corresponds to a number k<0.11, more preferably to a number k<0.08, and even more preferably to a number k<0.07. Thereby, the total angular shaft play between the input and output shafts 26, 28 will be low.

Although possible in theory, it is in practice, due to e.g. friction, oil viscosity, production tolerances, wear etc., impossible to perfectly cancel out the axial forces F1, F2 to exactly 100%. Therefore it is preferred that both input and output shafts 26, 28, as well as their respective gears 34, 44, be axially fixed relative to the housing 45, e.g. by means of a thrust bearing arrangement. Thereby, they will not translate axially, as the load conditions change, while the gear unit 24 is operated. This is of particular value in a gear unit for varying load conditions, such as a gear unit 24 for a wind turbine, since significant axial translation may cause shafts of gears to reach an end position in the gear unit housing 45, resulting in damage to the gear unit 24. Axial translation of the input or output shafts 26, 28 may also damage any upstream or downstream equipment such as a rotor bearing or a generator 22.

Even though not necessary, the input and output shafts 26, 28 illustrated in the examples hereinbefore are also radially fixed relative to the gear unit housing 45. Thereby, they will not translate radially due to changing load conditions while the gear unit 24 is operated.

In order to at least partly balance axial forces within each layshaft 30, 32, the respective drive and driven gears 38, 42 36, 40 of each layshaft 30, 32 are axially fixed relative to each other. By way of example, the driven gear 36 of the first layshaft 30 is axially fixed relative to the drive gear 38 of the same layshaft 30. Also the layshafts 30, 32 may be axially fixed relative to the gear unit housing 45. The layshafts 30, 32 may also be preloaded between respective pairs of axial preload bearings (not shown) in a manner similar to the preloading of the input and output shafts 26, 28.

The invention has mainly been described above with reference to a few embodiments. However, as is readily appreciated by a person skilled in the art, other embodiments than the ones disclosed above are equally possible within the scope of the invention, as defined by the appended patent claims.

For example, it will be appreciated that features of the different embodiments disclosed hereinbefore may be combined, so as to form still further embodiments. By way of example, the expressions (1)-(6) disclosed with reference to FIG. 4 represent preferred relations between transmission ratio, gear pitch diameters, and respective helix angles valid for all embodiments.

Moreover, depending on the desired transmission ratio, the gear unit may be provided with any number of layshafts connected in series between the input shaft and the output shaft, for example a single layshaft or three layshafts. In order to obtain the axial thrust balance described hereinbefore, the respective hands, pitch diameters and helix angles of the drive gear of the input shaft and the driven gear of the output shaft should be selected accordingly, as has been described hereinbefore.

The gear unit may also be provided with any number of layshaft arrangements connected in parallel between the input and output shafts. The mathematical expressions and conditions above relating to axial balance are still valid, if the parallel layshaft arrangements are similar with respect to helix angles and gear radii. For non-similar parallel layshaft arrangements, the expressions (1)-(6) may need to be adjusted accordingly, as will be appreciated by those skilled in the art.

It is not necessary that the gear unit 24 be placed in a housing so as to form a gearbox; alternatively, the gear unit 24 may be arranged in an open support structure or stand, in which shafts may be journalled, and to which a main thrust bearing support 50 may be attached.

The gear unit 24 may form a part of a larger gear unit or system; i.e., the gear unit 24 may be combined with other gearing, connected to the input and/or output shafts 26, 28, so as to form a larger gear system. By way of example, the gear unit 24 may be connected to a planetary gear, which, together with the gear unit 24, forms a gear system having a total transmission ratio different from that of the gear unit 24 alone.

It has been described above how the gear unit 24 can be used for providing a transmission ratio within a wind turbine. However, the field of application for a gear unit according to the invention is not limited to power generation installations such as wind turbines; by way of example, stationary, axial thrust-balanced gear units may as well be used in other industrial applications, e.g. paper mills.

The terms "helical gear" and "helix angle" are to be interpreted broadly, so as to include gears having teeth that are curved, such as spiral gears, but as a whole follow a generally helical path, such that those gears function in a manner equivalent to helical gears.

The invention claimed is:

1. Stationary gear unit comprising an input shaft, and an output shaft substantially parallel with said input shaft, the gear unit being configured for providing a transmission ratio ($I_{tot}$) between said input shaft and said output shaft via a layshaft arrangement, the input shaft being provided with a drive gear in mesh with a driven gear of said layshaft arrangement, and the output shaft being provided with a driven gear in mesh with a drive gear of said layshaft arrangement, the transmission ratio ($I_{tot}$) being non-unity such that one gear of the drive gear of the input shaft and the driven gear of the output shaft will be arranged for operating at a relatively lower torque, and the other gear will be arranged for operating at a relatively higher torque, either the driven gear of the output shaft will be arranged for operating at a relatively lower torque and the drive gear of the input shaft will be arranged for operating at a relatively higher torque, or the drive gear of the input shaft will be arranged for operating at a relatively lower torque and the driven gear of the output shaft will be arranged for operating at a relatively higher torque, said relatively higher torque being higher than said relatively lower torque, wherein the input shaft being journalled in an input shaft main thrust bearing arrangement, mounted to a main thrust bearing support, and being arranged for limiting axial movement of the input shaft in a first axial direction;

the output shaft being journalled in an output shaft main thrust bearing arrangement, said output shaft main thrust bearing arrangement being co-located with said input shaft main thrust bearing arrangement on said main thrust bearing support, said output shaft main thrust bearing arrangement being arranged for limiting axial movement of the output shaft in a second axial direction, said second axial direction being substantially opposite to said first axial direction;

said main thrust bearing support rigidly connecting the input shaft main thrust bearing arrangement to the output shaft main thrust bearing arrangement;

said drive gear of said input shaft being helical of a first hand;

said driven gear of said output shaft being helical of a second hand, said second hand being the same as the first hand for a positive transmission ratio ($I_{tot}$) and opposite to said first hand for a negative transmission ratio ($I_{tot}$);

wherein said one gear of the driven gear of the output shaft and the drive gear of the input shaft arranged for operating at a relatively lower torque has a helix angle ($\psi_{out}$) exceeding the helix angle ($\psi_{in}$) of said one gear of the drive gear of the input shaft and the driven gear of the output shaft arranged for operating at a relatively higher torque.

2. Stationary gear unit according to claim 1, said main thrust bearing support being fixed to a gear unit housing.

3. Stationary gear unit according to claim 1, said input shaft main thrust bearing arrangement being arranged on a first side of said main thrust bearing support, and said output shaft main thrust bearing arrangement being arranged on a second side of said main thrust bearing support, said second side being opposite to said first side.

4. The stationary gear unit according to claim 1, said main thrust bearing arrangement or arrangements being bidirectional for limiting axial movement of the respective input and/or output shaft in two axial directions.

5. The stationary gear unit according to claim 1, each of said input and output shafts being axially preloaded in a preloading arrangement.

6. The stationary gear unit according to claim 1, said input shaft and said output shaft being substantially concentric.

7. The stationary gear unit according to claim 1, said drive gear of said input shaft having an input shaft drive gear pitch diameter $D_{in}$ and an input shaft drive gear helix angle $\psi_{in}$;

said driven gear of said output shaft having an output shaft driven gear pitch diameter $D_{out}$ and an output shaft driven gear helix angle $\psi_{out}$; and said drive gear of said input shaft and said driven gear of said output shaft satisfying a condition corresponding to $$0.2 < \left| I_{tot} \frac{D_{in} \tan\Psi_{out}}{D_{out} \tan\Psi_{in}} \right| < 5,$$

wherein $I_{tot}$ is the transmission ratio of said gear unit.

8. The stationary gear unit according to claim 1, said layshaft arrangement comprising a plurality of substantially parallel layshafts connected in series, each layshaft being provided with a helical driven gear and a helical drive gear, the drive gear of each layshaft being of the same hand as the driven gear of the same layshaft.

9. The stationary gear unit according to claim 8, wherein, for each layshaft i of said plurality of layshafts, the respective driven gear has a driven gear pitch diameter $D_{driven,\,i}$ and a driven gear helix angle $\psi_{driven,\,i}$;

the respective drive gear has a drive gear pitch diameter $D_{drive,i}$ and a drive gear helix angle $\psi_{drive,i}$, the drive gear helix angle $\psi_{drive,i}$ being different from the driven gear helix angle $\psi_{driven,i}$; and $$0.2 < |(D_{drive,i} * \tan \psi_{driven,i})/(D_{driven,i} * \tan \psi_{drive,i})| < 5.$$

10. The stationary gear unit according to claim 1, wherein said gear unit is a step-up gear.

11. The stationary gear unit according to claim 1, said gear unit having a transmission ratio ($I_{tot}$), between said input shaft and said output shaft, of less than 1/20.

12. The stationary gear unit according to claim 1, said gear unit having a fixed transmission ratio ($I_{tot}$).

13. The stationary gear unit according to claim 1, said gear unit being a gear unit for a wind turbine.

14. The stationary gear unit according to claim 1, wherein the drive gear of the input shaft is axially fixed to the input shaft (26), and the driven gear of the output shaft is axially fixed to the output shaft.

15. The stationary gear unit according to claim 1, wherein, for each layshaft of said layshaft arrangement, the drive gear of the layshaft is axially fixed relative to the driven gear of the layshaft.

16. The stationary gear unit according to claim 1, wherein, for each shaft of said gear unit, the angular shaft play $\theta_S$ relative to another shaft of said gear unit satisfies the condition $$\theta_S < \tan^{-1}(0.11/n_G)$$

wherein $n_G$ represents the number of teeth of a gear of said shaft, said gear being in engagement with a gear of said another shaft.

* * * * *